United States Patent
Xue et al.

(10) Patent No.: US 9,300,490 B2
(45) Date of Patent: Mar. 29, 2016

(54) PACKET FORWARDING METHOD AND NETWORK DEVICE

(71) Applicant: HUAWEI TECHNOLOGIES CO., LTD., Shenzhen (CN)

(72) Inventors: Li Xue, Beijing (CN); Guoyi Chen, Shenzhen (CN); Tijun Shi, Nanjing (CN); Luyou He, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 224 days.

(21) Appl. No.: 13/908,207

(22) Filed: Jun. 3, 2013

(65) Prior Publication Data

US 2013/0266008 A1     Oct. 10, 2013

Related U.S. Application Data (63) Continuation of application No. PCT/CN2011/082006, filed on Nov. 10, 2011.

(30) Foreign Application Priority Data

Dec. 9, 2010   (CN) .......................... 2010 1 0581127

(51) Int. Cl.
*H04L 12/28*     (2006.01)
*H04L 12/54*     (2013.01)
(Continued)

(52) U.S. Cl.
CPC ............ *H04L 12/56* (2013.01); *H04L 12/4641* (2013.01); *H04L 45/00* (2013.01); *H04L 45/22* (2013.01); *H04L 45/28* (2013.01); *H04L 45/507* (2013.01); *H04L 45/68* (2013.01)

(58) Field of Classification Search
CPC .. H04L 12/56; H04L 2012/56; H04L 29/0653
See application file for complete search history.

(56) References Cited

U.S. PATENT DOCUMENTS 8,004,960 B2     8/2011   Raj
8,259,564 B1 *   9/2012   Gredler ............... G06F 11/2005
                                                              370/218
(Continued)

FOREIGN PATENT DOCUMENTS

CN        101123531           2/2008
CN        101552711 A        10/2009
(Continued)

OTHER PUBLICATIONS

Bocci et al., Inter-Chassis Communication protocol for L2VPN PE Redundancy, Oct. 13, 2010, Internet Engineering Task Force Internet Draft, at least pp. 5-72, pertinent sections 2-11.*

(Continued)

*Primary Examiner* — Hassan Phillips
*Assistant Examiner* — Siren Wei
(74) *Attorney, Agent, or Firm* — Staas & Halsey LLP (57) ABSTRACT

Embodiments provide a packet forwarding method and a network device, which are applicable to a system that includes a source node, a destination node, a first device, and a second device, where L1, L2, L3 and L4 are established, and the packet forwarding method includes: receiving, by the second device through a universal tunnel, a packet to be sent to a destination node, where the packet carries service data and one of identifiers of the L1, the L2, the L3, and the L4; according to the identifier carried in the packet, querying a preconfigured logical channel mapping in the second device, determining that a forwarding channel is the L4, and sending the service data in the packet to the destination node through the L4. By using the technical solutions, the number of ICB PWs can be reduced.

5 Claims, 8 Drawing Sheets

(51) Int. Cl.
  *H04L 12/46* (2006.01)
  *H04L 12/701* (2013.01)
  *H04L 12/721* (2013.01)
  *H04L 12/723* (2013.01)
  *H04L 12/707* (2013.01)
  *H04L 12/703* (2013.01)

(56) References Cited

U.S. PATENT DOCUMENTS

| | | | |
|---|---|---|---|
| 2003/0043792 | A1 | 3/2003 | Carpini et al. |
| 2006/0120279 | A1* | 6/2006 | Mitsumori ............ 370/218 |
| 2007/0253326 | A1 | 11/2007 | Saha et al. |
| 2007/0253416 | A1* | 11/2007 | Raj ............... H04L 45/02 370/390 |
| 2008/0181233 | A1* | 7/2008 | Washam ......... H04L 12/2859 370/395.5 |
| 2009/0154453 | A1 | 6/2009 | Shah et al. |
| 2011/0106925 | A1* | 5/2011 | Vogt ............ H04L 29/12509 709/222 |

FOREIGN PATENT DOCUMENTS

| | | |
|---|---|---|
| CN | 101582834 A | 11/2009 |
| CN | 101595691 | 12/2009 |
| CN | 101645836 | 2/2010 |
| WO | WO 2008/093310 A2 | 8/2008 |

OTHER PUBLICATIONS

Matthew Bocci et al. "Network High Availability for Ethernet Services Using IP/MPLS Networks." Next Generation Carrier Ethernet Transport Technologies. IEEE Communications Magazine. Mar. 2008.

L. Martini et al. "Pseudowire Setup and Maintenance Using the Label Distribution Protocol (LDP)" Network Working Group, The Internet Society. 2006.

L Martini et al. "Inter-Chassis Communication Protocol for L2VPN PE Redundancy" Internet Engineering Task Force. Oct. 13, 2010.

Extended European Search Report and Written Opinion on Search Authority issued on Dec. 13, 2013 in corresponding International Application No. PCT/CN2011/082006.

Office Action, dated Mar. 5, 2014, in corresponding Chinese Application No. 201010581127.9 (18 pp.).

International Search Report mailed on Feb. 16, 2012 in corresponding Chinese International Application No. PCT/CN2011/082006.

European Office Action dated Jun. 18, 2015 in corresponding European Patent Application No. 11847212.5.

* cited by examiner

```
+-+-+-+-+-+-+-+-+-+-+-+-+-+-+-+-+-+-+-+-+-+-+-+-+-+-+-+-+-+-+-+-+
|U|F|     Type=TBD          |            Length                 |
+-+-+-+-+-+-+-+-+-+-+-+-+-+-+-+-------------------------------+
|                                                              |
+                         RO  ID1                              +
|                                                              |
+--------------------------------------------------------------+
|                         PW  Label                            |
+--------------------------------------------------------------+
```

FIG. 7A

```
+-+-+-+-+-+-+-+-+-+-+-+-+-+-+-+-+-+-+-+-+-+-+-+-+-+-+-+-+-+-+-+-+
|U|F|   Type=GDT  disconnet (TBD)       |     Length            |
+-+-+-+-+-+-+-+-+-+-+-+-+-+-+-+-+-------------------------------+
*              Optional   sub-tlv                              *
+--------------------------------------------------------------+
```

PACKET FORWARDING METHOD AND NETWORK DEVICE

CROSS-REFERENCE TO RELATED APPLICATIONS

This application is a continuation of International Application No. PCT/CN2011/082006, filed on Nov. 10, 2011, which claims priority to Chinese Patent Application No. 201010581127.9, filed on Dec. 9, 2010, both of which are hereby incorporated by reference in their entireties.

FIELD OF THE INVENTION

The present invention relates to the field of communications technologies, and in particular, to a packet forwarding method and a network device.

BACKGROUND OF THE INVENTION

Figure 1:
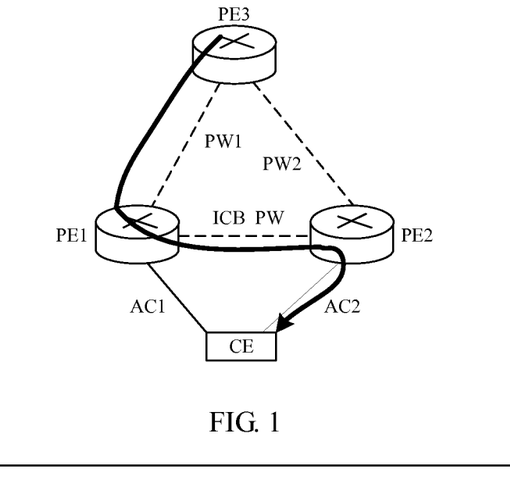
FIG. 1 is a schematic diagram of data transmission by using a redundant object group in the prior art.

In an actual network deployment procedure, reliability of data transmission is an important measurement index for evaluating a network, and at present, the reliability of data transmission may be enhanced through an inter-chassis redundancy mechanism. As shown in FIG. 1, a PE1 (provider edge, Provider Edge, referred to as PE) and a PE2 belong to one redundancy group, configured to protect a link between an upstream device in the redundancy group and a CE1 (customer edge, customer edge, referred to as CE). The PE1 is connected to a PE3 via a pseudowire PW1 and is connected to the CE1 via an attachment circuit AC1; the PE2 is connected to the PE3 via a pseudowire PW2 and is connected to the CE1 via an attachment circuit AC2; and assume that the AC1 is an active link and the AC2 is a standby link. It should be noted that FIG. 1 only shows one pseudowire between the PE1 and the PE3 and one pseudowire between the PE2 and the PE3, while pseudowires are bound to services one by one; if multiple types of service data is transmitted between the upstream device in the redundancy group and the CE1, then accordingly, there are multiple pseudowires between the PE1 and the PE3, and there are multiple pseudowires between the PE2 and the PE3.

In the prior art, an ICB PW is established between the PE1 and the PE2, each ICB PW (inter-chassis backup pseudowire) is bound to a service type one by one. When detecting failure on the active link AC1, the PE1 notifies the PE3, and the PE3 triggers protection switching; and before the protection switching is executed, a path through which the PE3 sends service data to the CE1 includes that: the PE3 sends a data packet to the PE1, the PE1 changes a label of the pseudowire between the PE1 and the PE3 (assumed to be a label of the PW1) into a label of the ICB PW bound to the service and then forwards it through the ICB PW to the PE2, and the PE2 then forwards it through the AC2 to the CE1.

The prior art has the following disadvantages:

In the prior art, an ICB PW have to be bound to a service one by one; when one CE needs to perform multiple services, accordingly, multiple ICB PWs are established between the PE1 and the PE2, while the ICB PW is usually manually configured; therefore, in a situation where a large number of PWs are needed, a workload of configuration is heavy.

SUMMARY OF THE INVENTION

Embodiments of the present invention provide a packet forwarding method and a network device, which can reduce the number of ICB PWs.

In light of this, the embodiments of the present invention provide:

A packet forwarding method is applicable to a communication system which includes a source node, a destination node, a first device, and a second device, where the destination node and the source node each have dual-homed connections to the first device and the second device, a first logical channel L1 is established between the source node and the first device and a second logical channel L2 is established between the source node and the second device, a third logical channel L3 is established between the destination node and the first device and a fourth logical channel L4 is established between the destination node and the second device, and the method includes:

receiving, by the second device through a universal tunnel preestablished between the first device and the second device, a packet to be sent to the destination node, where the packet carries service data and one of identifiers of the L1, the L2, the L3, and the L4;

querying, by the second device, according to the identifier carried in the packet, a preconfigured logical channel mapping in the second device, and determining that a forwarding channel for forwarding the service data in the packet is the L4, where the preconfigured logical channel mapping is a mapping between a logical channel and the L4, and the logical channel corresponds to the identifier; and sending, by the second device, the service data in the packet to the destination node through the L4.

A packet forwarding method is applicable to a communication system which includes a source node, a destination node, a first device, and a second device, where the destination node and the source node have dual-homed connections to the first device and the second device, a first logical channel L1 is established between the source node and the first device and a second logical channel L2 is established between the source node and the second device, a third logical channel L3 is established between the destination node and the first device and a fourth logical channel L4 is established between the destination node and the second device, and the method includes:

receiving, by the first device, from the L1, a first packet sent by the source node, where the first packet carries service data and an identifier of the L1;

querying, by the first device, according to the identifier of the L1, a preconfigured logical channel mapping in the first device when the L3 fails, and determining an identifier of a logical channel, where the identifier has a mapping with the identifier of the L1; and sending, by the first device, a second packet to the second device through a universal tunnel preestablished between the first device and the second device, where the second packet includes the service data and the identifier of the logical channel, where the logical channel has a mapping with the L1.

A packet forwarding method is applicable to a communication system which includes a source node, a destination node, a first device, and a second device, where the destination node has dual-homed connections to the first device and the second device, a first logical channel L1 is established between the source node and the first device, a second logical channel L2 is established between the destination node and the first device, a third logical channel L3 is established between the destination node and the second device, and the method includes:

receiving, by the second device through a universal tunnel preestablished between the first device and the second device, a packet to be sent to the destination node, where the packet carries service data and one of identifiers of the L1, the L2, and the L3;

querying, by the second device, according to the identifier carried in the packet, a preconfigured logical channel mapping in the second device, and determining that a forwarding channel for forwarding the service data in the packet is the L3, where the preconfigured logical channel mapping is a mapping between a logical channel and the L3, and the logical channel corresponds to the identifier; and sending, by the second device, the service data in the packet to the destination node through the L3.

A packet forwarding method is applicable to a communication system which includes a source node, a destination node, a first device, and a second device, where the destination node has dual-homed connections to the first device and the second device, a first logical channel L1 is established between the source node and the first device, a second logical channel L2 is established between the destination node and the first device, a third logical channel L3 is established between the destination node and the second device, and the method includes:

receiving, by the first device, from the L1, a first packet sent by the source node, where the first packet carries service data and an identifier of the L1;

querying, by the first device, according to the identifier of the L1, a preconfigured logical channel mapping in the first device when the L2 fails, and determining an identifier of a logical channel, where the identifier has a mapping with the identifier of the L1; and sending, by the first device, a second packet to the second device through a universal tunnel preestablished between the first device and the second device, where the second packet includes the service data and the identifier of the logical channel, where the logical channel has a mapping with the L1.

A network device includes:

a first transceiver unit, configured to receive a packet to be sent to a destination node, through a universal tunnel preestablished between the network device and another network device located in a same redundant object group as the network device, where the packet carries service data and one of identifiers of a first logical channel L1, a second logical channel L2, a third logical channel L3, and a fourth logical channel L4; the first logical channel is a logical channel between a source node and the another network device; the second logical channel is a logical channel between the source node and the network device; the third logical channel is a logical channel between the destination node and the another network device; the fourth logical channel is a logical channel between the destination node and the network device;

a forwarding channel determining unit, configured to, according to the identifier carried in the packet, query a preconfigured logical channel mapping in the network device, and determine that a forwarding channel for forwarding the service data in the packet is the L4, where the preconfigured logical channel mapping is a mapping between a logical channel and the L4, and the logical channel corresponds to the identifier; and a second transceiver unit, configured to send the service data in the packet to the destination node through the L4.

According to the embodiments of the present invention, the first device in the redundant object group sends the packet, which will be sent to the destination node, to the second device through the preestablished universal tunnel, where the packet carries the service data and one of the identifiers of the logical channel L1 between the first device to the source node, the logical channel L2 between the first device and the destination node, the logical channel L3 between the second device and the source node, and the logical channel L4 between the second device and the destination node, so that the second device can determine that the forwarding channel for forwarding the service data in the packet is the L4 according to the preconfigured logical channel mapping (that is, a mapping between a logical channel and the L4, where the logical channel corresponds to the identifier), and send the service data in the packet through the L4; in such a packet forwarding manner, there is no need to establish different protection pseudowires for different services as in the prior art, and the number of ICB PWs is reduced.

BRIEF DESCRIPTION OF THE DRAWINGS

To illustrate the technical solutions in the embodiments of the present invention more clearly, the following briefly describes accompanying drawings needed for describing the embodiments. Obviously, the accompanying drawings in the following description are merely some embodiments of the present invention, and persons of ordinary skill in the art may obtain other drawings from these accompanying drawings without making creative efforts.

DETAILED DESCRIPTION OF THE EMBODIMENTS

Figure 2A:
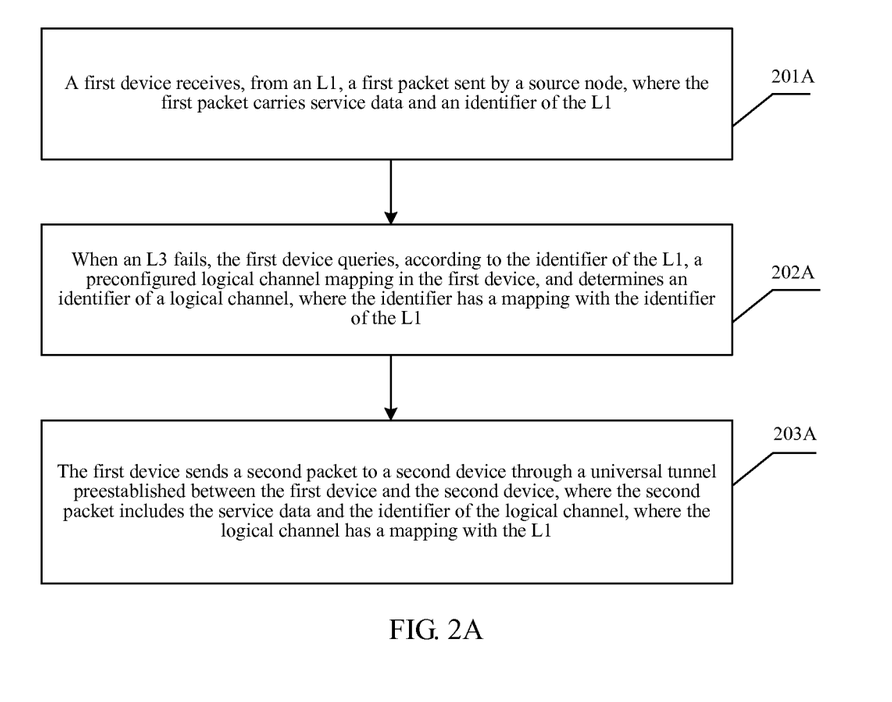
FIG. 2A is a flow chart of a packet forwarding method of a first device according to an embodiment of the present invention.

Referring to FIG. 2A, an embodiment of the present invention provides a packet forwarding method, which is applicable to a communication system that includes a source node, a destination node, a first device, and a second device, where the destination node and the source node have dual-homed connections to the first device and the second device, a first logical channel L1 is established between the source node and the first device and a second logical channel L2 is established between the source node and the second device, a third logical channel L3 is established between the destination node and the first device and a fourth logical channel L4 is established between the destination node and the second device, and the method includes:

201A. The first device receives, from the L1, a first packet sent by the source node, where the first packet carries service data and an identifier of the L1.

202A. When the L3 fails, the first device queries, according to the identifier of L1, a preconfigured logical channel mapping in the first device, and determines an identifier of a logical channel, where the identifier has a mapping with the identifier of the L1.

The preconfigured logical channel mapping is a mapping between the L1 and the L2, a mapping between the L1 and an identifier of L3, and a mapping between the identifier of L1 and an identifier of L4.

The foregoing mapping may be statically configured. Specifically, the logical channel mapping is configured on the second device according to a configuration command of a user, or the foregoing mapping is established according to a notification message sent by the first device, where reference may be made to detailed description in the subsequent embodiments for a specific implementation manner of establishing the mapping according to the notification message.

203A. The first device sends a second packet to the second device through a universal tunnel preestablished between the first device and the second device, where the second packet includes the service data and the identifier of the logical channel, where the logical channel has a mapping with the L1.

In the embodiment and the subsequent embodiments of the present invention, the first logical channel L1 and the second logical channel L2 are a first pseudowire PW1 and a second pseudowire PW2, respectively; the third logical channel L3 and the fourth logical channel L4 are a first attachment circuit AC1 and a second attachment circuit AC2, respectively; or, the first logical channel L1 and the second logical channel L2 are a first attachment circuit AC1 and a second attachment circuit AC2, respectively; the third logical channel L3 and the fourth logical channel L4 are a first pseudowire PW1 and a second pseudowire PW2, respectively; or, the first logical channel L1, the second logical channel L2, the third logical channel L3, and the fourth logical channel L4 are a first pseudowire PW1, a second pseudowire PW2, a third pseudowire PW3, and a fourth pseudowire PW4, respectively; or, the first logical channel L1, the second logical channel L2, the third logical channel L3, and the fourth logical channel L4 are a first label-switched path LSP1, a second label-switched path LSP2, a third label-switched path LSP3, and a fourth label-switched path LSP4, respectively.

In the embodiment of the present invention, the first device in a redundant object group sends the packet, which will be sent to the destination node, to the second device through the preestablished universal tunnel, where the packet carries the service data and the identifier of a logical channel, where the identifier has a mapping with the identifier of the L1, so that the second device finds a channel for forwarding the service data in the packet according to the identifier of the logical channel, where the logical channel has a mapping with the identifier of the L1 carried in the packet, and forward the service data to the destination node through the found channel; in such a packet forwarding manner, there is no need to establish different protection pseudowires for different services as in the prior art, and the number of ICB PWs is reduced.

Figure 2B:
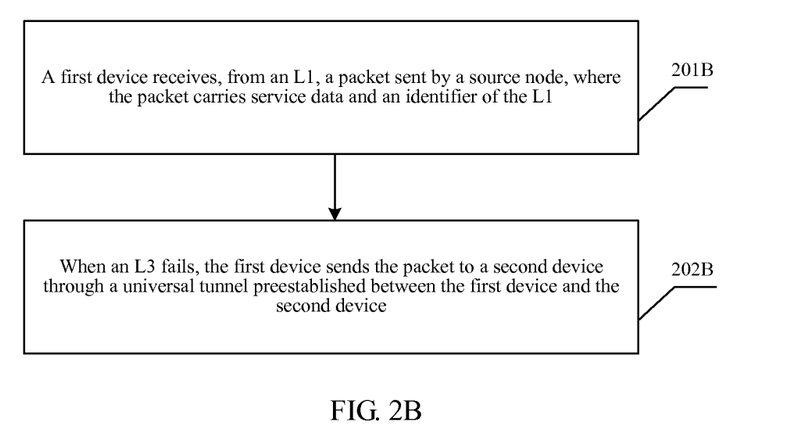
FIG. 2B is a flow chart of a packet forwarding method of a first device according to another embodiment of the present invention.

Referring to FIG. 2B, an embodiment of the present invention provides a packet forwarding method, an applied environment of which is the same as that of the embodiment shown in FIG. 2A and is not repeatedly described here, and the method includes:

201B. The first device receives, from the L1, a packet sent by the source node, where the packet carries service data and an identifier of the L1.

202B. When the L3 fails, the first device sends the packet to the second device through a universal tunnel preestablished between the first device and the second device.

In the embodiment of the present invention, the first device in a redundant object group sends the packet, which will be sent to a destination node, to the second device through the preestablished universal tunnel, where the packet carries the service data and the identifier of L1, so that the second device finds a channel for forwarding the service data in the packet according to the identifier of L1 carried in the packet, and forwards the service data to the destination node through the found channel; in such a packet forwarding manner, there is require to establish different protection pseudowires for different services as in the prior art, and the number of ICB PWs is reduced.

Figure 2C:
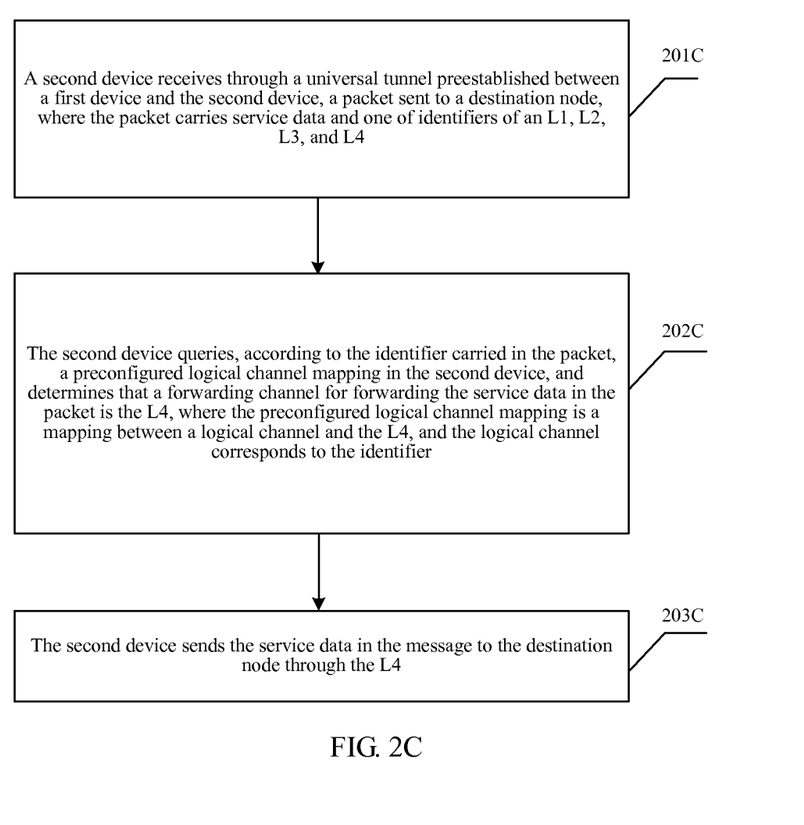
FIG. 2C is a flow chart of a packet forwarding method of a second device according to an embodiment of the present invention.

Referring to FIG. 2C, an embodiment of the present invention provides a packet forwarding method, an applied environment of which is the same as that of the embodiment shown in FIG. 2A and is not repeatedly described here, and the method includes:

201C: The second device receives, through a universal tunnel preestablished between the first device and the second device, a packet sent to a destination node, where the packet carries service data and one of identifiers of the L1, the L2, the L3, and the L4.

202C. The second device queries, according to the identifier carried in the packet, a preconfigured logical channel mapping in the second device, and determines that a forwarding channel for forwarding the service data in the packet is the L4, where the preconfigured logical channel mapping is a mapping between a logical channel and the L4, and the logical channel corresponds to the identifier.

The preconfigured logical channel mapping specifically includes at least one of a mapping between the L1 and the L4, a mapping between the L2 and the L4, a mapping between the L3 and the L4, and a mapping between the L4 and the L4. The foregoing mapping may be statically configured, or may specifically be that a logical channel mapping is configured on the second device according to a configuration command of a user, or the foregoing mapping is established according to a notification message sent by the first device, and specifically, reference may be made to detailed description of the subsequent embodiments for a manner of establishing the mapping according to the notification message.

The first device and the second device in the foregoing three embodiments belong to a same redundant object group. It should be noted that the first device in each embodiment is any device in the redundant object group, and the second device is another device that is located in the same redundant object group as the first device.

203C. The second device sends the service data in the packet to the destination node through the L4.

In the embodiment of the present invention, the first device in the redundant object group sends the packet, which is sent to the destination node, to the second device through the preestablished universal tunnel, where the packet carries the service data and one of the identifiers of the logical channel L1 between the first device to a source node, the logical channel L2 between the first device and the destination node, the logical channel L3 between the second device and the source node, and the logical channel L4 between the second device and the destination node, so that the second device can determine that a forwarding channel for forwarding the service data in the packet is the L4 according to the preconfigured logical channel mapping (that is, a mapping between a logical channel and the L4, where the logical channel corresponds to the identifier), and send the service data in the packet through the L4; in such a packet forwarding manner, there is no need to establish different protection pseudowires for different services as in the prior art, and the number of ICB PWs is reduced.

To make the technical solutions provided in the embodiments of the present invention clearer, a solution in which devices in a redundant object group notify configuration information to each other and a mapping is configured according to a notification message is provided as follows:

1). A first device receives a notification message sent by a second device, where the notification message carries an identifier of an L2 or a mapping between the L2 and an L3, and the first device, according to the notification message, establishes a mapping between the L2 and an L1 and establishes a mapping between the L2 and the L3; or, the notification message carries an identifier of an L4 or a mapping between the L4 and the L3, and the first device, according to the notification message, establishes a mapping between the L4 and an L1 and establishes a mapping between the L4 and the L3.

2). The second device receives a notification message sent by the first device, where the notification message carries an identifier of the L1 or a mapping between the L1 and the L3, and the second device, according to the notification message, establishes a mapping between the L1 and the L4 and establishes a mapping between the L1 and the L2; or, the notification message carries an identifier of the L3 or a mapping between the L1 and the L3, and the second device, according to the notification message, establishes a mapping between the L3 and the L4 and establishes a mapping between the L3 and the L2.

Such a manner of configuring a mapping is applicable to that only one source node and one destination node each have dual-homed connections to the first device and the second device.

Another solution in which devices in a redundant object group notify configuration information to each other and a mapping is configured according to a notification message is provided as follows:

1). A first device receives a notification message sent by a second device, where the notification message includes: at least one of an identifier of an L4 and a mapping between an L2 and the L4, a redundant object identifier ROID indicating an application of a logical channel between the redundant object group and the source node, and an identifier of the redundant object group; the first device determines, according to the identifier of the redundant object group and the ROID in the notification message, that an L1 is a logical channel between the first device and the source node, where the logical channel corresponds to the ROID, and establishes a mapping between the L1 and the L2.

Or, the notification message includes: at least one of an identifier of an L4 and a mapping between an L2 and the L4, a ROID indicating an application of a logical channel between a redundant object group and the destination node, and an identifier of the redundant object group; the first device determines, according to the identifier of the redundant object group and the ROID in the notification message, that an L3 is a logical channel between the first device and the destination node, where the logical channel corresponds to the ROID, and establishes a mapping between a logical channel L1, which is bound to the L3, and the L2.

Or, the notification message includes: at least one of an identifier of an L4 and a mapping between an L2 and the L4, a redundant object identifier ROID indicating an application of a logical channel between a redundant object group and the source node, and an identifier of the redundant object group; the first device determines, according to the identifier of the redundant object group and the ROID in the notification message, that an L1 is a logical channel between the first device and the source node, where the logical channel corresponds to the ROID, and establishes a mapping between the L1 and the L4.

Or, the notification message includes: at least one of an identifier of an L4 and a mapping between an L2 and the L4, a ROID indicating an application of a logical channel between a redundant object group and the destination node, and an identifier of the redundant object group; the first device determines, according to the identifier of the redundant object group and the ROID in the notification message, that an L3 is a logical channel between the first device and the destination node, where the logical channel corresponds to the ROID, and establishes a mapping between a logical channel L1, which is bound to the L3, and the L4.

2). The second device receives a notification message sent by the first device, where the notification message includes: at least one of an identifier of the L1 and a mapping between the L1 and the L3, a redundant object identifier ROID indicating an application of a logical channel between the redundant object group and the source node, and the identifier of the redundant object group; the second device determines, according to the identifier of the redundant object group and the ROID in the notification message, that the L2 is a logical channel between the second device and the source node, where the logical channel corresponds to the ROID, determines that the L1 and the L2 are protection paths for each other, and establishes a mapping between the logical channel L4, which is bound to the L2, and the L1.

Or, the notification message includes: at least one of an identifier of the L1 and a mapping between the L1 and the L3, a ROID indicating an application of a logical channel between the redundant object group and the destination node, and the identifier of the redundant object group; the second device determines, according to the identifier of the redundant object group and the ROID in the notification message, that the L4 is a logical channel between the second device and the destination node, where the logical channel corresponds to the ROID, and establishes a mapping between the L4 and the L1.

Or, the notification message includes: at least one of an identifier of the L3 and a mapping between the L1 and the L3, a redundant object identifier ROID indicating an application of a logical channel between the redundant object group and the source node, and the identifier of the redundant object group; the second device determines, according to the identifier of the redundant object group and the ROID in the notification message, that the L2 is a logical channel between the second device and the source node, where the logical channel corresponds to the ROID, and establishes a mapping between the logical channel L4, which is bound to the L2, and the L3.

Or, the notification message includes: at least one of an identifier of L3 and a mapping between the L1 and the L3, a ROID indicating an application of a logical channel between the redundant object group and the destination node, and the identifier of the redundant object group; the second device determines, according to the identifier of the redundant object group and the ROID in the notification message, that the L4 is a logical channel between the second device and the destination node, where the logical channel corresponds to the ROID, and establishes a mapping between the L4 and the L3.

Such a manner of configuring a mapping is applicable to a scenario where multiple source nodes or multiple destination nodes have dual-homed connections to a first device and a second device.

Another solution in which devices in a redundant object group notify configuration information to each other and a mapping is configured according to a notification message is provided as follows:

1). A first device receives a notification message sent by a second device, where the notification message includes: at least one of an identifier of an L4 and a mapping between an L2 and the L4, a ROID indicating an application for negotiating configuration information of a redundant object in the redundant object group, and an identifier of the redundant object group; the first device, according to the identifier of the redundant object group and the ROID in the notification message, establishes a mapping between the L4 and an L1 and establishes a mapping between the L4 and an L3.

Or, the notification message includes: at least one of an identifier of an L2 and a mapping between the L2 and an L4, a ROID indicating an application for negotiating configuration information of a redundant object in the redundant object group, and an identifier of the redundant object group; the first device, according to the identifier of the redundant object group and the ROID in the notification message, establishes a mapping between the L2 and an L1 and establishes a mapping between the L2 and an L3.

2). The second device receives a notification message sent by the first device, where the notification message includes: at least one of an identifier of the L3 and a mapping between the L1 and the L3, a ROID indicating an application for negotiating configuration information of a redundant object in the redundant object group, and the identifier of the redundant object group; the second device, according to the identifier of the redundant object group and the ROID in the notification message, establishes a mapping between the L4 and the L3 and establishes a mapping between the L2 and the L3.

Or, the notification message includes: at least one of an identifier of the L1 and a mapping between the L1 and the L3, a ROID indicating an application for negotiating configuration information of a redundant object in the redundant object group, and the identifier of the redundant object group; the second device, according to the identifier of the redundant object group and the ROID in the notification message, establishes a mapping between the L4 and the L1 and establishes a mapping between the L2 and the L1.

Such a manner of configuring a mapping is applicable to a scenario where only one source node and one destination node each have dual-homed connections to the first device and the second device. For a scenario where multiple source nodes or multiple destination nodes each have dual-homed connections to the first device and the second device, the first device and the second device need to establish a mapping between the L1 and the L2 in advance, that is, the L1 and the L2 are protection paths for each other, establish a mapping between the L3 and the L4, that is, the L3 and the L4 are protection paths for each other; because the mapping is established between the L3 and the L4 in advance, when receiving the carried identifier of the L3 or a mapping between the L1 and the L3, the first device learns, according to the identifier of the L3 and the preestablished mapping between the L3 and the L4, that the L3 is a logical channel corresponding to an application of a logical channel between the redundant object group and the destination node, and then establishes a mapping between the L4 and the L1 according to the preconfigured binding relationship between the L3 and the L1, and likewise, the first device establishes a mapping between the L2 and the L1.

In the following an example that the L1 and the L2 are pseudowires (assumed to be a PW1 and a PW2) and the L3 and the L4 are attachment circuits (assumed to be an AC1 and an AC2) is taken to specifically describe a procedure that the devices in the redundant object group exchange notification messages and establish mappings.

1. A device in a redundancy group sends a redundancy group connect RG Connect packet, where the packet carries ROIDs (redundant object identifier, Redundant Object Identifier) of all applications using the GDT in the device.

The message is a notification message, which may be received by all other devices in the redundancy group.

Figure 3:
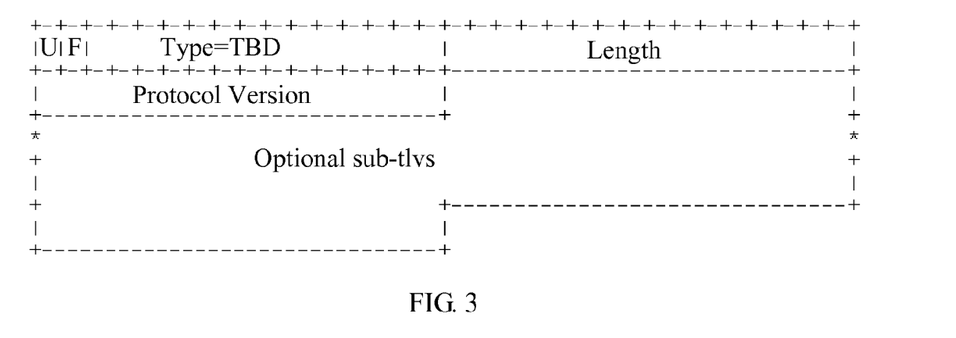
FIG. 3 is a format diagram of an RG GDT application connect TLV according to an embodiment of the present invention.
Figure 4:
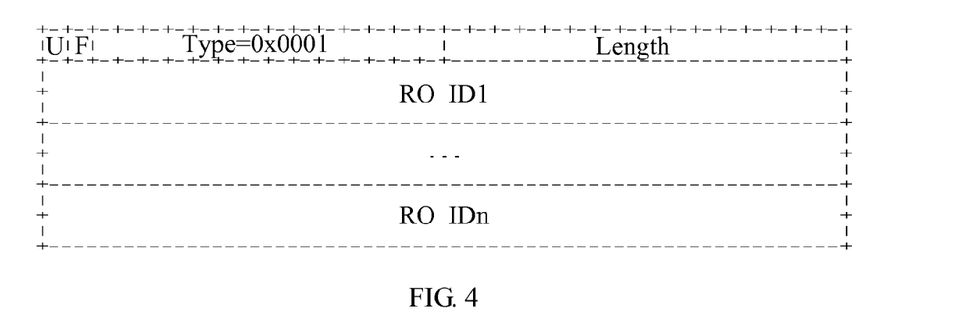
FIG. 4 is a format diagram of a sub-tlv in an RG GDT application connect TLV according to an embodiment of the present invention.

The RG Connect packet carries a redundancy group GDT application to establish an RG GDT application connect TLV, a format of the RG GDT application connect TLV may be as shown in FIG. 3, and Type=TBD, identifying the TLV as an RG GDT application connect TLV; Length is the total length of optional sub-tlvs, the optional sub-tlvs carry ROIDs of all the applications using the GDT in the device; in the embodiment of the present invention, all the applications using the GDT include: an application of a protection attachment circuit and an application of a protection pseudowire, so the ROIDs carried in the optional sub-tlvs include: a ROID identifying the protection pseudowire (assumed to be a ROID1) and a ROID identifying the protection attachment circuit (assumed to be a ROID2). For the foregoing third manner, all the applications using the GDT include: an application for negotiating configuration information of a redundant object in the redundant object group, assumed to be a ROID3; a protocol version may be 1. All the ROIDs may be carried in multiple sub-tlvs, and at this time, each sub-TLV carries one ROID; and also one sub-tlv may carry all the ROIDs; FIG. 4 shows a manner that one sub-tlv carries all the ROIDs.

2. The device in the redundancy group sends a redundancy group application data message RG application data message for a certain application, where the message carries a binding relationship between a PW and an AC which are related to the application on this device.

The message is a notification message, which can be received by all other devices in the redundancy group.

Figure 5:
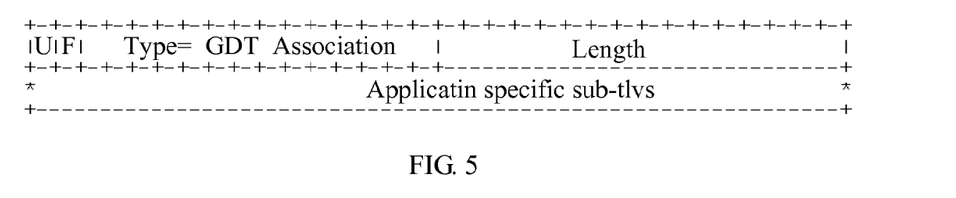
FIG. 5 is a format diagram of a GDT application association TLV according to an embodiment of the present invention.
Figure 6:
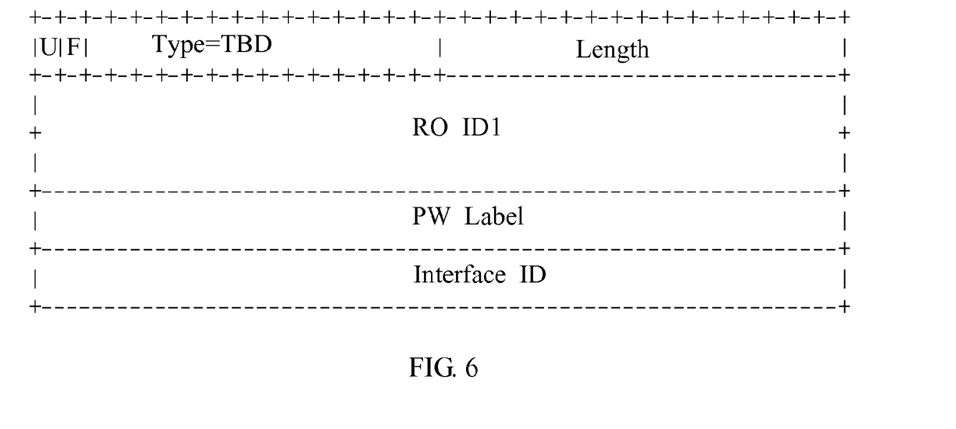
FIG. 6 is a format diagram of a sub-tlv in a GDT application association TLV according to an embodiment of the present invention.

The RG application data message extends to carry GDT application association GDT application association tlvs, which are used for identifying the binding relationship between the PW and the AC which are related to the certain application using the GDT on the device. The format of the GDT application association TLV is as shown in FIG. 5, and Type=GDT Association, identifying that the TLV is a GDT application association TLV, and Application specific sub-tlvs carry an identifier of the certain application and the binding relationship between the PW and the AC related to the application. Length is the length of the Application specific sub-tlvs. A format of a sub-tlv may be as shown in FIG. 6. Optionally, the sub-tlv may further carry a PW ID and the PW ID may be identified by FEC128 and may also be identified by FEC129.

3. A device in the redundant object group configures a forwarding entry.

To clearly describe how to configure a forwarding label, assume that a PE1 and a PE2 form one redundant object group.

In this step, after receiving a notification message of a protection pseudowire, where the notification message is sent by the PE1 (the notification message carries a binding relationship between a PW2 and an AC2), the PE2 determines that the pseudowire PW2 between the PE2 and a source node and a pseudowire PW1 between the PE1 and the source node are protection paths for each other, and establishes a binding relationship between the PW1 and the link AC2 between PW2 and a destination node, where the binding relationship between the PW1 and the AC2 may be: a binding relationship between a label of the PW1 and an identifier of the AC2, and the identifier of AC2 may be an interface identifier interface ID2 of the AC2.

After receiving a notification message of a protection attachment circuit, where the notification message is sent by the PE1 (the notification message carries the binding relationship between the PW2 and the AC2), the PE2 determines that the attachment circuit AC2 between the PE2 and the destination node and an attachment circuit AC1 between the PE1 and the destination node are protection paths for each other, and establishes a binding relationship between the PW2 and the AC1, where the binding relationship between the PW2 and the AC1 may be a binding relationship between a label of PW2 and an identifier of AC1, and the identifier of AC1 may be an interface identifier interface ID1 of the AC1.

The PE2 configures a forwarding entry according to the foregoing established correspondence, as shown in Table 1:

TABLE 1

| RG Identifier | Binding Relationship Between PW and AC |
| --- | --- |
| RG ID | Label of PW1 <—> Identifier of AC1 |
| | Label of PW2 <—> Identifier of AC1 |
| | Label of PW1 <—> Identifier of AC2 |
| | Label of PW2 <—> Identifier of AC2 |

Likewise, a forwarding entry configured on the PE1 is also as shown in Table 1. It may be seen from Table 1 that, because the label of the PW1 and the identifier of AC2 have a binding relationship, and the label of the PW1 and the identifier of the AC1 have a binding relationship, the identifier of AC2 and the identifier of AC1 have a mapping.

Figure 7A:
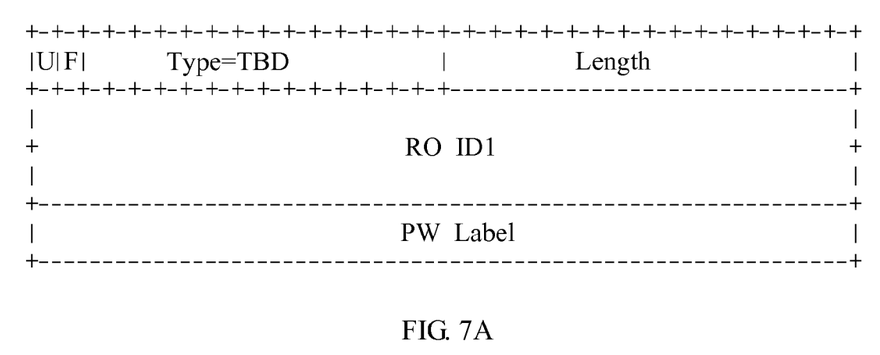
FIG. 7A is a format diagram of another sub-tlv in a GDT application association TLV according to an embodiment of the present invention.

Or, the RG application data message extends to carry GDT application association tlvs, and the format of the GDT application association TLV is as shown in FIG. 5. Application specific sub-tlvs carry a ROID of a certain application, and an identifier of a path protected by the application. A format of a sub-tlv may be as shown in FIG. 7. Optionally, it may further carry a PW ID, and the PW ID may be identified by FEC128, and may also be identified by FEC129. In the embodiment of the present invention, assume that the application using the GDT includes: an application of a protection attachment circuit and an application of a protection pseudowire, so that in this step the device in the redundancy group sends a notification message of a protection pseudowire and a notification message of a protection attachment circuit, and assuming that the messages are sent by the PE1, the notification message of the protection pseudowire includes: the ROID1 and the label of PW1, and the notification message of the protection attachment circuit includes: the ROID2 and the identifier of AC1. Subsequently, after receiving the notification message of the protection pseudowire, where the notification message is sent by the PE1, the PE2 determines that the pseudowire PW2 between the PE2 and the source node and the pseudowire PW1 between the PE1 and the source node are protection paths for each other, and configures a forwarding entry, as shown in Table 2:

TABLE 2

| RG Identifier | PW |
| --- | --- |
| RG ID | Label of PW1 |
| | Label of PW2 |
| | Label of AC1 |
| | Label of AC2 |

Likewise, a forwarding table is also established on the PE1, and the established forwarding table is the same as the forwarding table established on the PE2. It should be noted that by adopting such a manner of notifying configuration information, the forwarding entries established on the PE2 and the PE1 may also be as shown in FIG. 1, which does not affect implementation of the present invention.

Figure 7B:
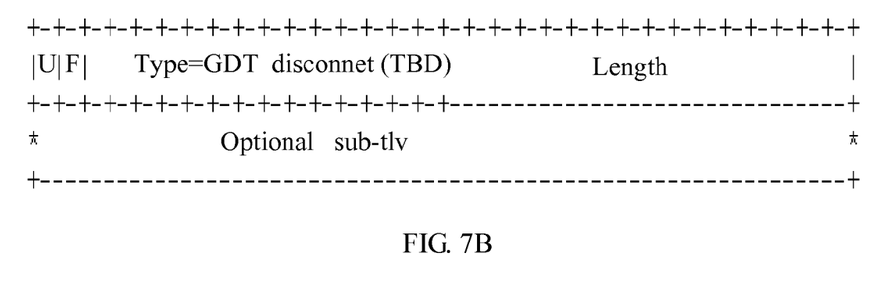
FIG. 7B is a format diagram of an RG GDT application disconnect TLV according to an embodiment of the present invention.

When an application needs to be deleted or an RG connection needs to be deleted, the device in the redundant object group may send a redundant object group disconnect RG disconnect packet, an ICCP status code (inter-chassis communication protocol status code) in a Disconnect Code TLV in the packet identifies deletion of the RG connection or deletion of the application on the RG; if it is the deletion of the RG connection, the TLV of the application does not need to be carried; if it is the deletion of the application on the RG, the RG disconnect packet further needs to carry an Application-specific disconnect TLV, the Application-specific disconnect TLV carries an RG GDT application disconnect TLV to specify the deletion of the GDT application, and a format of the RG GDT application disconnect TLV is as shown in FIG. 7B; Type=TBD, identifying the RG GDT application disconnect TLV; Optional sub-tlvs carry a ROID of the application to be deleted; the ROID is carried in two manners: in one manner the ROID is carried in one sub-TLV, and in the other manner the ROID is carried in multiple sub-tlvs, which does not affect the implementation of the present invention.

Figure 8:
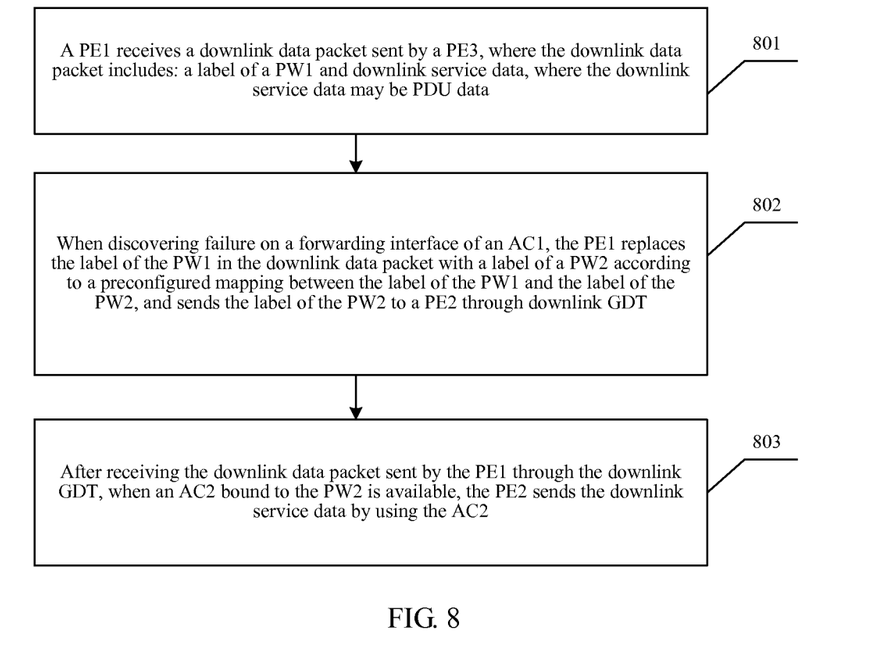
FIG. 8 is a flow chart of a downlink packet forwarding method according to an embodiment of the present invention.

As shown in FIG. 8, an embodiment of the present invention provides a method for transmitting downlink service data, in the method, assume that a source node is a PE3, a destination node is a CE1, the source node sends downlink service data to the destination node, and the method specifically includes:

801. A PE1 receives a downlink data packet sent by a PE3, where the downlink data packet includes: a public network label PSN Label, a label of a PW1, and downlink service data; the downlink service data may be PDU data.

802. The PE1 strips the received downlink data packet of the PSN Label, views that a private network label is the label of the PW1, determines that an AC corresponding to the PW1 is an AC1, and when discovering failure on a forwarding interface of the AC1, replaces the label of the PW1 in the downlink data packet with a label of a PW2 according to a preconfigured mapping between the label of the PW1 and the label of the PW2, and sends the label of the PW2 to a PE2 through downlink GDT.

The preconfigured mapping between the label of the PW1 and the label of the PW2 indicates a mapping between the PW1 and the pseudowire PW2, where the PW2 and the PW1 are protection paths for each other.

803. After receiving the downlink data packet sent by the PE1 through the downlink GDT, when an AC2 bound to the PW2 is available, the PE2 sends the downlink service data to a CE1 by using the AC2.

It should be noted that in this step, after receiving the downlink data packet sent by the PE1, the PE2 makes a mark on the downlink data packet; if the AC2 is unavailable, the PE2 directly discards the downlink data packet, so as to prevent cyclic forwarding of the downlink data packet between the PE1 and the PE2.

In the embodiment of the present invention, when the AC1 bound to the PW1 fails, before sending the downlink data packet to the PE2 through the GDT, the PE1 replaces the label of the PW1 with the label of the PW2, so that after receiving the downlink data packet, the PE2 may directly send the downlink service data through the AC2 bound to the PW2; by adopting this manner, the GDT is unrelated to a specific service, and it may be one pseudowire or a bidirectional LSP and so on, and there is no need to establish different pseudowires for different services as in the prior art.

Figure 9:
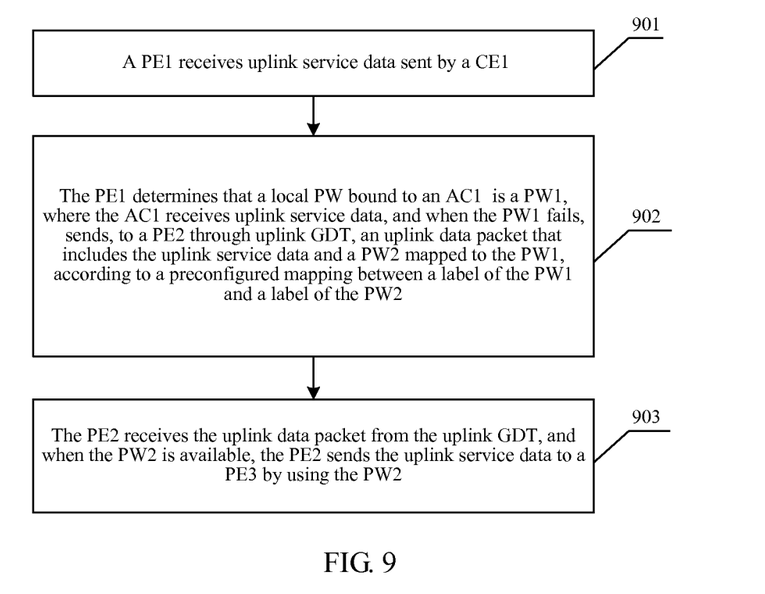
FIG. 9 is a flow chart of an uplink packet forwarding method according to an embodiment of the present invention.

As shown in FIG. 9, an embodiment of the present invention provides a method for transmitting uplink service data, in the method, assume that a source node is a CE1, a destination node is a PE3, the source node sends uplink service data to the destination node, and the method specifically includes:

901. A PE1 receives uplink service data sent by a CE1.

902. The PE1 determines that a PW bound to an AC1 is a PW1, where the AC1 receives the uplink service data, and when the PW1 fails, sends, to a PE2 through uplink GDT, an uplink data packet that includes the uplink service data and a PW2 mapped to the PW1, according to a preconfigured mapping between a label of the PW1 and a label of the PW2.

903. The PE2 receives the uplink data packet from the uplink GDT, and when the PW2 is available, the PE2 sends the uplink service data to a PE3 by using the PW2.

When the PW2 is unavailable, the data packet is discarded, so as to prevent cyclic forwarding of the uplink data packet between the PE1 and the PE2.

In the embodiment of the present invention, when the uplink service data needs to be sent, if the PW1 fails, the PE1 sends, to the PE2 through the uplink GDT, the uplink data packet that includes the uplink service data and the PW2, so that the PE2 directly sends the uplink service data to an upstream device through the PW2. By adopting this manner, the GDT is unrelated to a specific service, and it may be one pseudowire or a bidirectional LSP and so on, and there is no need to establish different pseudowires for different services as in the prior art.

Figure 10:
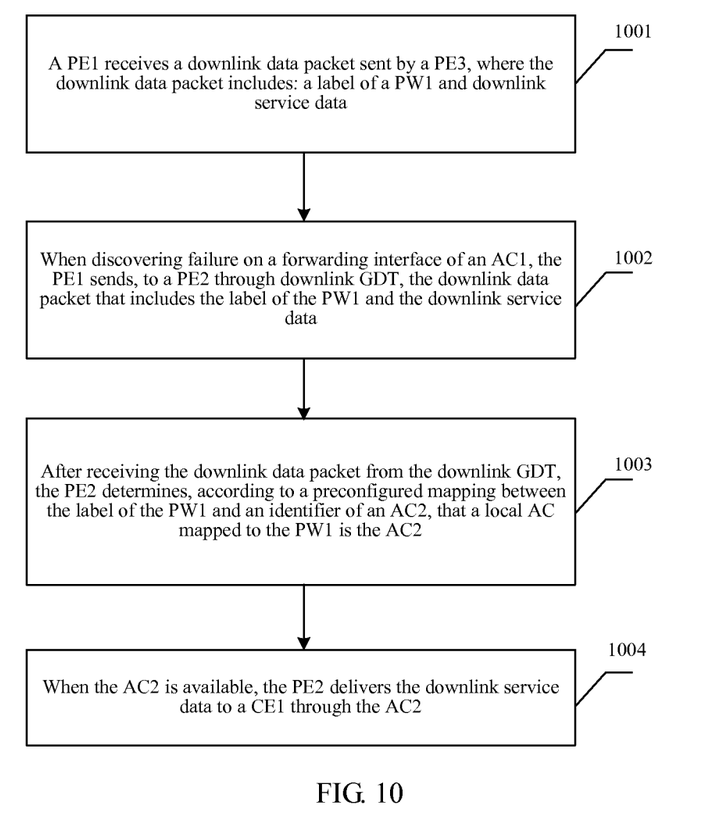
FIG. 10 is a flow chart of a downlink packet forwarding method according to another embodiment of the present invention.

Referring to FIG. 10, an embodiment of the present invention provides a method for transmitting downlink service data, in the method, assume that a source node is a PE3, a destination node is a CE1, the source node sends downlink service data to the destination node, and the method specifically includes:

1001. A PE1 receives a downlink data packet sent by a PE3, where the downlink data packet includes: a public network label PSN Label, a label of a PW1, and downlink service data; the downlink service data may be PDU data.

1002. The PE1 strips the received downlink data packet of the PSN Label, views that a private network label is the label of the PW1, determines that an AC corresponding to the PW1 is an AC1, and when discovering failure on a forwarding interface of the AC1, sends, to a PE2 through downlink GDT, the downlink data packet with the PSN Label stripped.

1003. After receiving the downlink data packet from the downlink GDT, the PE2 determines, according to a preconfigured mapping between the label of the PW1 and an identifier of an AC2, that an AC mapped to the PW1 is the AC2.

The preconfigured mapping between the label of the PW1 and the identifier of the AC2 is a mapping between the PW1, and the AC2 to which a PW2 is bound, where the PW1 and the PW2 are protection paths for each other.

1004. When the AC2 is available, the PE2 delivers the downlink service data to a CE1 through the AC2.

When the AC2 is unavailable, the PE2 directly discards the downlink data packet.

In the embodiment of the present invention, when the AC1 fails, after receiving the downlink data packet sent by the PE1 device, the PE2 determines that an AC mapped to the PW1 is the AC2, and sends the downlink service data through the AC2; by adopting such a manner, the GDT is unrelated to a specific service, and it may be only one pseudowire or a bidirectional LSP and so on, and there is no need to establish different pseudowires for different services as in the prior art.

Figure 11:
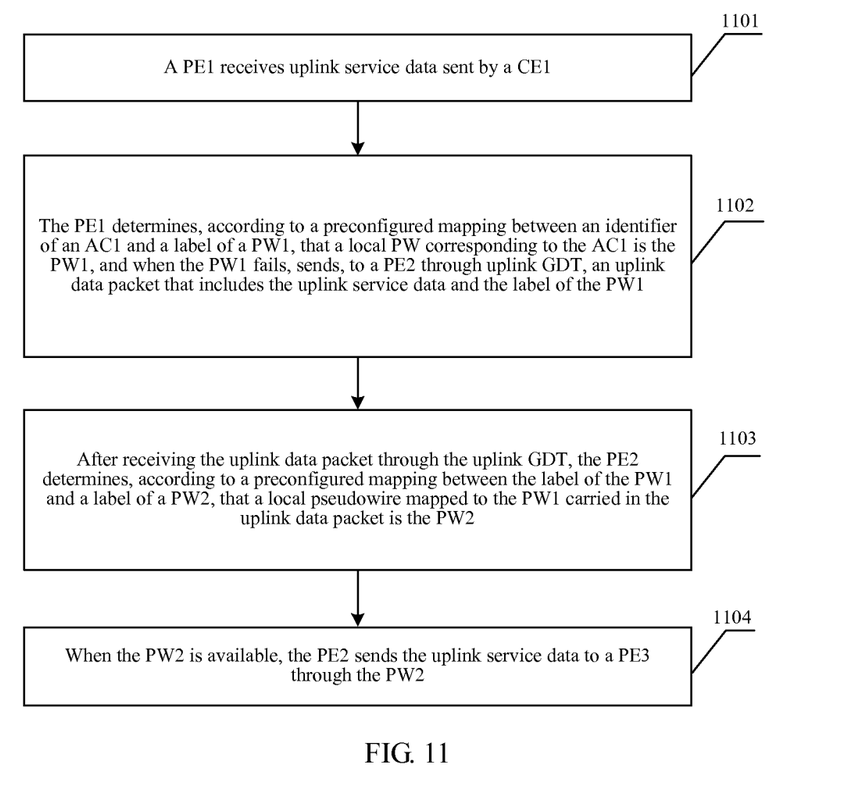
FIG. 11 is a flow chart of an uplink packet forwarding method according to another embodiment of the present invention.

Referring to FIG. 11, an embodiment of the present invention provides a method for transmitting uplink service data, in the method, assume that a source node is a CE1, a destination node is a PE3, the source node sends uplink service data to the destination node, and the method specifically includes:

1101. A PE1 receives uplink service data sent by a CE1.

In this embodiment, assume that an attachment circuit through which the PE1 receives the uplink service data is an AC1.

1102. The PE1 determines, according to a preconfigured mapping between an identifier of the AC1 and a label of a PW1, that a PW corresponding to the AC1 is the PW1, and when the PW1 fails, sends, to a PE2 through uplink GDT, an uplink data packet that includes the uplink service data and the label of the PW1.

1103. After receiving the uplink data packet through the uplink GDT, the PE2 determines, according to a preconfigured mapping between the label of the PW1 and a label of a PW2, that a pseudowire mapped to the PW1 carried in the uplink data packet is the PW2.

The preconfigured mapping between the PW1 and the PW2 is a mapping between the PW1 and the pseudowire PW2, where the PW1 and the PW2 are protection paths for each other.

1104. When the PW2 is available, the PE2 sends the uplink service data to a PE3 through the PW2.

When the PW2 is unavailable, the PE2 directly discards the uplink data packet.

In the embodiment of the present invention, when an uplink service is being sent and the PW1 fails, after receiving the uplink data packet that includes the PW1 and the uplink service data and is sent by the PE1, the PE2 sends the uplink service data through the PW2 mapped to the PW1. By adopting such a manner, the GDT is unrelated to a specific service, and it may be only one pseudowire or a bidirectional LSP and so on, and there is no need to establish different pseudowires for different services as in the prior art.

The foregoing embodiments are description of the technical solutions provided in the present invention in a scenario where both the destination node and the source node have dual-homed connections to a first device and a second device; for a scenario where only the destination node or the source node has dual-homed connections to the first device and the second device, the technical solutions provided in the present invention are also applicable. A main difference is that, in the scenario where only the destination node has dual-homed connections to the first device and the second device, a mapping preconfigured by the second device includes a mapping between a logical channel between the first device and the source node and a logical channel between the second device and the destination node, and/or a mapping between a logical channel between the first device and the destination node and a logical channel between the second device and the destination node; a preset mapping on the first device includes: a mapping between the logical channel between the first device and the source node and the logical channel between the first device and the destination node, and/or, a mapping between the logical channel between the first device and the source node and the logical channel between the second device and the destination node.

Figure 12:
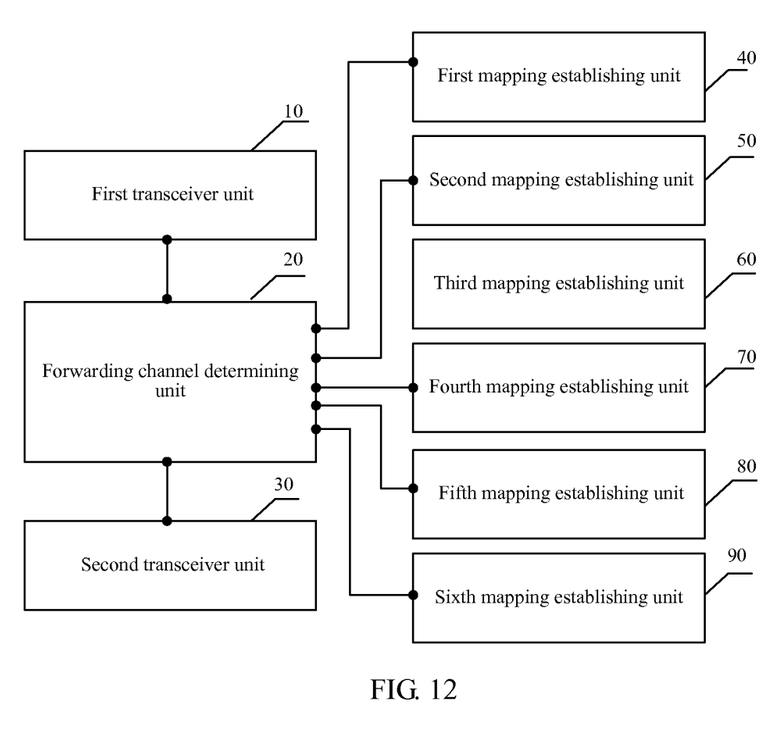
FIG. 12 is a structural diagram of a network device according to an embodiment of the present invention.

Referring to FIG. 12, an embodiment of the present invention provides a network device, where the network device includes:

a first transceiver unit 10, configured to receive a packet to be sent to a destination node, through a universal tunnel preestablished between the network device and another network device located in a same redundant object group as the network device, where the packet carries service data and one of identifiers of a first logical channel L1, a second logical channel L2, a third logical channel L3, and a fourth logical channel L4; the first logical channel is a logical channel between a source node and the another network device; the second logical channel is a logical channel between the source node and the network device; the third logical channel is a logical channel between the destination node and the another network device; and the fourth logical channel is a logical channel between the destination node and the network device;

a forwarding channel determining unit 20, configured to, according to the identifier carried in the packet, query a preconfigured logical channel mapping in the network device, and determine that a forwarding channel for forwarding the service data in the packet is the L4, where the preconfigured logical channel mapping is a mapping between a logical channel and the L4, and the logical channel corresponds to the identifier; and a second transceiver unit 30, configured to send the service data in the packet to the destination node through the L4.

To establish a mapping, the network device further includes: a first mapping establishing unit 40, adapted to configure the logical channel mapping according to a configuration command of a user.

Or, the first transceiver unit 10 is further configured to receive a notification message sent by a first device, where the notification message carries the identifier of the L1 or a mapping between the L1 and the L3; the network device further includes: a second mapping establishing unit 50, configured to establish a mapping between the L1 and the L4 according to the notification message; or, the first transceiver unit 10 is further configured to receive a notification message sent by a first device, where the notification message carries the identifier of the L3 or a mapping between the L1 and the L3; the network device further includes: a third mapping establishing unit 60, configured to establish a mapping between the L3 and the L4 according to the notification message.

Or, the first transceiver unit 10 is further configured to receive a notification message sent by the another network device, where the notification message includes at least one of the identifier of the L1 and a mapping between the L1 and the L3, a redundant object identifier ROID indicating an application of a logical channel between the redundant object group and the source node, and an identifier of the redundant object group; the network device further includes: a fourth mapping establishing unit 70, configured to, according to the identifier of the redundant object group and the ROID in the notification message, determine that the L2 is a logical channel between the network device and the source node, where the logical channel corresponds to the ROID, determine that the L1 and the L2 are protection paths for each other, and establish a mapping between the logical channel L4, which is bound to the L2, and the L1.

Or, the first transceiver unit 10 is further configured to receive a notification message sent by the another network device, where the notification message includes: at least one of the identifier of L1 and a mapping between the L1 and the L3, a ROID indicating an application of a logical channel between the redundant object group and the destination node, and an identifier of the redundant object group; and the network device further includes: a fifth mapping establishing unit 80, configured to, according to the identifier of the redundant object group and the ROID in the notification message, determine that the L4 is a logical channel between the network device and the destination node, where the logical channel corresponds to the ROID, and establish a mapping between the L4 and the L1.

Or, the first transceiver unit 10 is further configured to receive a notification message sent by the another network device, where the notification message includes: at least one of the identifier of the L3 and a mapping between the L1 and the L3, a redundant object identifier ROID indicating an application of a logical channel between the redundant object group and the source node, and an identifier of the redundant object group; the network device further includes: a sixth mapping establishing unit 90, configured to, according to the identifier of the redundant object group and the ROID in the notification message, determine that the L2 is a logical channel between the network device and the source node, where the logical channel corresponds to the ROID, and establish a mapping between the logical channel L4, which is bound to the L2, and the L3.

Or, the first transceiver unit 10 is further configured to receive a notification message sent by the first device, where the notification message includes: at least one of the identifier of the L3 and a mapping between the L1 and the L3, a ROID indicating an application of a logical channel between the redundant object group and the destination node, and an identifier of the redundant object group; the network device further includes: a seventh mapping establishing unit 100, further configured to, according to the identifier of the redundant object group and the ROID in the notification message, determine that the L4 is a logical channel between the network device and the destination node, where the logical channel corresponds to the ROID, and establish a mapping between the L4 and the L3.

Or, the first transceiver unit is further configured to receive a notification message sent by the another network device, where the notification message includes: at least one of the identifier of the L3 and a mapping between the L1 and the L3, a ROID indicating an application for negotiating configuration information of a redundant object in the redundant object group, and an identifier of the redundant object group; the network device further includes: an eighth mapping establishing unit 200, configured to establish a mapping between the L4 and the L3 according to the identifier of the redundant object group and the ROID in the notification message.

Or, the first transceiver unit is further configured to receive a notification message sent by the another network device, where the notification message includes: at least one of the identifier of the L1 and a mapping between the L1 and the L3, a ROID indicating an application for negotiating configuration information of a redundant object in the redundant object group, and an identifier of the redundant object group; the network device further includes: a ninth mapping establishing unit 300, configured to establish a mapping between the L4 and the L1 according to the identifier of the redundant object group and the ROID in the notification message.

It should be noted that FIG. 12 shows nine mapping establishing units; however, the nine mapping establishing units do not need to coexist on the network device simultaneously, and the network device may have only one mapping establishing unit or several mapping establishing units of them, which is specifically determined according to a mapping that needs to be established in the present invention.

In the embodiment of the present invention, the network device receives the packet, where the packet is sent to the destination node, from the another network device through the preestablished universal tunnel, where the packet carries the service data and one of the identifiers of the logical channel L1 between the another network device and the source node, the logical channel L2 between the network device and the destination node, the logical channel L3 between the another network device and the source node, and the logical channel L4 between the network device and the destination node, in this way, the network device can determine, according to the preset logical channel mapping (that is, a mapping between a logical channel and the L4, where the logical channel corresponds to the identifier), that the forwarding channel for forwarding the service data in the packet is the L4, and send the service data in the packet through the L4; in such a packet forwarding manner, there is no need to establish different protection pseudowires for different services as in the prior art, and the number of ICB PWs is reduced.

Persons of ordinary skill in the art may understand that all of or part of the steps of the method in the foregoing embodiments may be implemented by a program instructing relevant hardware. The program may be stored in a computer readable storage medium, for example, a read-only memory, a magnetic disk, or a compact disk and so on.

The packet transmission method and the network device provided in the embodiments of the present invention are described in detail in the foregoing. The principle and implementation manner of the present invention are described here by using specific examples. The description of the foregoing embodiments of the present invention is merely used for ease of understanding of the method and a core idea of the present invention. Meanwhile, persons of ordinary skill in the art may make variations in terms of a specific implementation manner and an application scope according to the idea of the present invention. To sum up, the content of the specification shall not be understood as a limit to the present invention.

What is claimed is:

1. A packet forwarding method, applicable to a communication system which comprises a source node, a destination node, a first device, and a second device, wherein the destination node and the source node each have dual-homed connections to the first device and the second device, a first logical channel (L1) is established between the source node and the first device and a second logical channel (L2) is established between the source node and the second device, and a third logical channel (L3) is established between the destination node and the first device and a fourth logical channel (L4) is established between the destination node and the second device, and the method comprises:

receiving, by the second device through a universal tunnel preestablished between the first device and the second device, a packet to be sent to the destination node, wherein the packet carries service data and one of identifiers of the L1, the L2, the L3, and the L4, and the universal tunnel is different from each of the L1, the L2, the L3, and the L4;

querying, by the second device, according to the identifier carried in the packet, a preconfigured logical channel mapping in the second device, and determining that a forwarding channel for forwarding the service data in the packet is the L4, wherein the preconfigured logical channel mapping is a mapping between a logical channel being the L1, the L2, the L3 or the L4 and the L4, the logical channel being the L1, the L2, the L3 or the L4 corresponds to the identifier and the preconfigured logical channel mapping specifically comprises at least one of a mapping between the L1 and the L4, a mapping between the L2 and the L4, a mapping between the L3 and the L4, and a mapping between the L4 and the L4; and sending, by the second device, the service data in the packet to the destination node through the L4, wherein the first logical channel (L1) and the second logical channel (L2) are a first pseudowire (PW1) and a second pseudowire (PW2), respectively; and the third logical channel (L3) and the fourth logical channel (L4) are a first attachment circuit (AC1) and a second attachment circuit (AC2), respectively;

wherein preconfiguring the logical channel mapping comprises:

configuring the logical channel mapping on the second device according to a configuration command of a user.

2. A packet forwarding method, applicable to a communication system which comprises a source node, a destination node, a first device, and a second device, wherein the destination node and the source node each have dual-homed connections to the first device and the second device, a first logical channel (L1) is established between the source node and the first device and a second logical channel (L2) is established between the source node and the second device, and a third logical channel (L3) is established between the destination node and the first device and a fourth logical channel (L4) is established between the destination node and the second device, and the method comprises:

receiving, by the first device, from the L1, a first packet sent by the source node, wherein the first packet carries service data and an identifier of the L1;

when the L3 fails, querying, by the first device, according to the identifier of the L1, a preconfigured logical channel mapping in the first device, and determining an identifier of a logical channel being the L1, the L2, the L3 or the L4, wherein the identifier has a mapping with the identifier of the L1, the first logical channel (L1) and the second logical channel (L2) are a first pseudowire (PW1) and a second pseudowire (PW2), respectively; and the third logical channel (L3) and the fourth logical channel (L4) are a first attachment circuit (AC1) and a second attachment circuit (AC2), respectively; and sending, by the first device, a second packet to the second device through a universal tunnel preestablished between the first device and the second device, wherein the universal tunnel is different from each of the L1, the L2, the L3 and the L4, the second packet comprises the service data and the identifier of the logical channel, the logical channel being the L1, the L2, the L3 or the L4 has a mapping with the L1 and the preconfigured logical channel mapping specifically comprises at least one of a mapping between the L1 and the L2, a mapping between the L1 and the L3, and a mapping between the L1 and the L4 wherein preconfiguring the logical channel mapping comprises:

configuring the logical channel mapping on the first device according to a configuration command of a user.

3. A packet forwarding method, applicable to a communication system which comprises a source node, a destination node, a first device, and a second device, wherein the destination node has dual-homed connections to the first device and the second device, a first logical channel (L1) is established between the source node and the first device, a second logical channel (L2) is established between the destination node and the first device, and a third logical channel (L3) is established between the destination node and the second device, and the method comprises:

receiving, by the second device through a universal tunnel preestablished between the first device and the second device, a packet to be sent to the destination node, wherein the packet carries service data and one of identifiers of the L1, the L2, and the L3;

querying, by the second device, according to the identifier carried in the packet, a preconfigured logical channel mapping in the second device, and determining that a forwarding channel for forwarding the service data in the packet is the L3, wherein the preconfigured logical channel mapping is a mapping between a logical channel being the L1, the L2 or the L3 and the L3, and the logical channel being the L1, the L2 or the L3 corresponds to the identifier; and sending, by the second device, the service data in the packet to the destination node through the L3, wherein the preconfigured logical channel mapping specifically comprises at least one of a mapping between the L1 and the L3, a mapping between the L2 and the L3, and a mapping between the L3 and the L3, the first logical channel (L1) is a first pseudowire (PW1); and the second logical channel (L2) and the third logical channel (L3) are a first attachment circuit (AC1) and a second attachment circuit (AC2), respectively;

wherein preconfiquring the logical channel mapping comprises:

configuring the logical channel mapping on the second device according to a configuration command of a user.

4. A packet forwarding method, applicable to a communication system which comprises a source node, a destination node, a first device, and a second device, wherein the destination node has dual-homed connections to the first device and the second device, a first logical channel (L1) is established between the source node and the first device, a second logical channel (L2) is established between the destination node and the first device, and a third logical channel (L3) is established between the destination node and the second device, and the method comprises:

receiving, by the first device, from the L1, a first packet sent by the source node, wherein the first packet carries service data and an identifier of the L1;

when the L2 fails, querying, by the first device, according to the identifier of the L1, a preconfigured logical channel mapping in the first device, and determining an identifier of a logical channel being the L2 or the L3, wherein the identifier has a mapping with the identifier of the L1; and sending, by the first device through a universal tunnel preestablished between the first device and the second device, a second packet to the second device, wherein the second packet comprises the service data and the identifier of the logical channel being the L2 or the L3, the logical channel being the L2 or the L3 has a mapping with the L1 and the universal tunnel is different from each of the L1, the L2 and the L3, the first logical channel (L1) is a first pseudowire (PW1); and the second logical channel (L2) and the third logical channel (L3) are a first attachment circuit (AC1) and a second attachment circuit (AC2), respectively;

wherein preconfiguring the logical channel mapping comprises:

configuring the logical channel mapping on the first device according to a configuration command of a user.

5. A network device, wherein the network device comprises:

a memory; and a processor coupled to the memory, wherein the processor is configured to:

receive a packet sent to a destination node, through a universal tunnel preestablished between the network device and another network device located in a same redundant object group as the network device, wherein the packet carries service data and one of identifiers of a first logical channel (L1), a second logical channel (L2), a third logical channel (L3), and a fourth logical channel (L4); the first logical channel is a logical channel between a source node and the another network device; the second logical channel is a logical channel between the source node and the network device; the third logical channel is a logical channel between the destination node and the another network device; the fourth logical channel is a logical channel between the destination node and the network device and the universal tunnel is different from each of the L1, the L2, the L3 and the L4;

according to the identifier carried in the packet, query a preconfigured logical channel mapping in the network device, and determine that a forwarding channel for forwarding the service data in the packet is the L4, wherein the preconfigured logical channel mapping is a mapping between a logical channel being the L1, the L2, the L3 or the L4 and the L4, and the logical channel being the L1, the L2, the L3 or the L4 corresponds to the identifier; and send the service data in the packet to the destination node through the L4, wherein the first logical channel (L1) and the second logical channel (L2) are a first pseudowire (PW1) and a second pseudowire (PW2), respectively; and the third logical channel (L3) and the fourth logical channel (L4) are a first attachment circuit (AC1) and a second attachment circuit (AC2), respectively;

wherein the processor is further configured to:

configure the logical channel mapping according to a configuration command of a user.

* * * * *